United States Patent [19]

Stultz et al.

[11] Patent Number: 5,174,865
[45] Date of Patent: Dec. 29, 1992

[54] PROCESS FOR PURIFYING CRUDE HYDROCHLORIC ACID

[75] Inventors: Jeff H. Stultz, Freeport, Tex.; Heinz Rörup, Kutenholz, Fed. Rep. of Germany; Siegfried Unger, Buxtehude, Fed. Rep. of Germany; Edmund R. Nettersheim, Dollern, Fed. Rep. of Germany; Bernd Wottawa, Himmelpforten, Fed. Rep. of Germany

[73] Assignees: Dow Deutschland Inc., Rheinmunster, Fed. Rep. of Germany; The Dow Chemical Company, Midland, Mich.

[21] Appl. No.: 646,135

[22] Filed: Jan. 25, 1991

[51] Int. Cl.⁵ .......................... B01D 1/26; C01B 7/07
[52] U.S. Cl. .......................... 203/12; 203/22; 203/25; 203/42; 203/80; 55/71; 159/20.1; 159/DIG. 16; 159/DIG. 19; 202/174; 423/240 R; 423/488
[58] Field of Search .......................... 203/12, 22, 71, 73, 203/80, 91, 25, 42; 159/DIG. 16, DIG. 19, 17.1, 20.1; 423/488, 240 R; 55/71

[56] References Cited

U.S. PATENT DOCUMENTS

| | | | |
|---|---|---|---|
| 1,853,330 | 4/1932 | Barstow et al. | 203/12 |
| 1,906,467 | 5/1933 | Heath | 203/12 |
| 2,743,219 | 4/1956 | Riehm | 203/12 |
| 3,394,056 | 7/1968 | Nadler et al. | 203/12 |
| 3,816,599 | 6/1974 | Kafes | 203/12 |
| 4,115,531 | 9/1978 | Opitz et al. | 423/240 R |
| 4,608,120 | 8/1986 | Greenfield et al. | 159/17.1 |
| 4,617,180 | 10/1986 | Vogg | 423/240 R |

FOREIGN PATENT DOCUMENTS

| | | | |
|---|---|---|---|
| 843996 | 8/1960 | United Kingdom | 423/488 |
| 1350727 | 4/1974 | United Kingdom | 423/240 R |

Primary Examiner—Wilbur Bascomb, Jr.

[57] ABSTRACT

Aqueous hydrochloric acid of very high purity can be obtained in a process for purifying crude aqueous 5 to 20 wt. % hydrochloric acid. In the purification, process water or a water/HCl mixture is evaporated from the crude aqueous hydrochloric acid at a pressure of from 0.01 to 1.0 bar and a temperature of from 10° to 100° C. until a crude, azeotropic mixture of water and HCl is obtained. The crude, azeotropic mixture of water and HCl is distilled in a distillation apparatus at a pressure of from 0.1 to 1.5 bar and a temperature of from 50° to 110° C. A purified gaseous, azeotropic mixture of water and HCl is recovered from the head of the distillation apparatus and a liquid mixture is left at the bottom of the distillation apparatus. The liquid mixture which is left at the bottom of the distillation apparatus is distilled at a pressure of from 0.5 to 2.5 bar and a temperature of from 80° to 130° C.

15 Claims, 1 Drawing Sheet

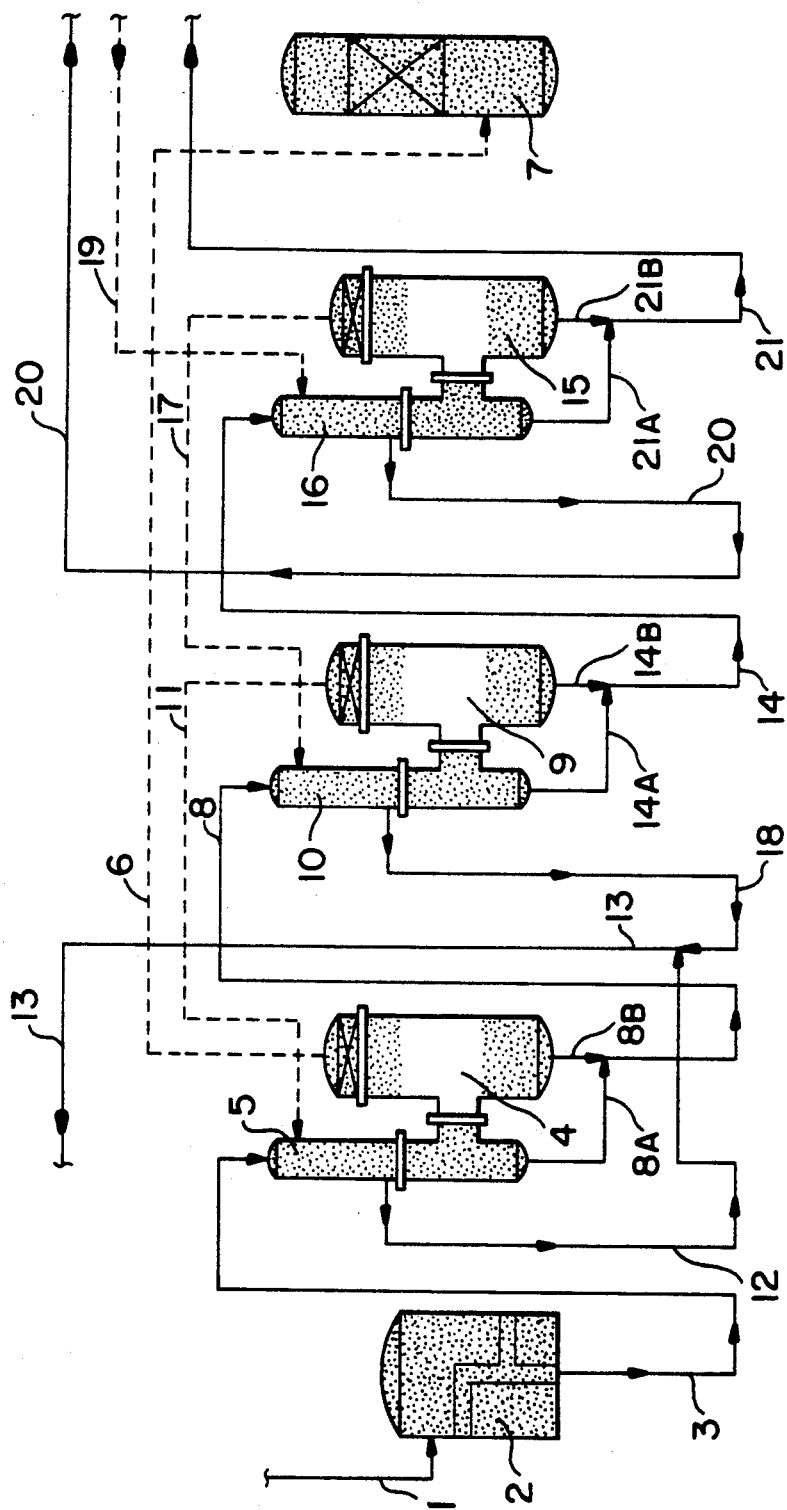

PROCESS FOR PURIFYING CRUDE HYDROCHLORIC ACID

BACKGROUND OF THE INVENTION

The present invention relates to a process for purifying crude aqueous 5 to 20 wt.-% hydrochloric acid which has for example been recovered from combustion gases originating from waste incineration.

Waste incineration and the recovery of aqueous hydrochloric acid from the combustion gases of the waste incineration has been known for a long time. In the past, the recovered aqueous hydrochloric acid has usually been neutralized or flocculated and then disposed of. However, the neutralization, for example with caustic, is expensive and the disposal of the produced salts is now frequently objected to by the environmentalists. Accordingly, much research efforts have been spent on possibilities of reusing the aqueous hydrochloric acid.

British patent specification 1 350 727 suggests cooling the combustion gases obtained from the incineration of halogenated organic materials and absorbing at least a part of the acid constituent(s) thereof in a cooling and adsorption zone consisting of an elongated conduit in which a continuous film of flowing water or aqueous halogen acid is maintained on the inner wall, separating the cooled gases from the liquid leaving the conduit and scrubbing the cooled gases in a scrubbing zone in order to remove any remaining acid constituent(s). The aqueous halogen acid solution is recovered in a recovery system in the desired concentration. However, the unpurified aqueous halogen acid solution usually contains an unduly high amount of solids and/or heavy metal salts.

German Offenlegungsschrift DE-A-33 34 677 relates to a process of recovering hydrogen chloride from chlorinated hydrocarbon residues, particularly those originating from the vinyl chloride production. The hydrochloric acid, which has been obtained from the incineration and a subsequent quenching cycle is first evaporated, then overheated and directly passed to an oxychlorination reactor. The described process may be useful for recovering hydrogen chloride from chlorinated hydrocarbon residues which are relatively clean and not mixed with a large amount of other components. However, when burning a blend of many different chlorinated hydrocarbon residues and, optionally, other nonchlorinated products which originate, for example from chemical production plants or municipal waste, the aqueous hydrochloric acid usually contains a high amount of solids and/or heavy metal salts. Such hydrochloric acid generally is not pure enough to be recycled to the oxychlorination reactor after evaporation and overheating.

Chemical Abstracts 82(24):158273u suggests feeding the combustion gas obtained from burning vinyl chloride waste plastic to an absorption column to recover crude HCl. The crude aqueous HCl is then evaporated and condensed to give refined HCl. Again, aqueous refined HCl which is pure enough for most enduse applications is not obtained by this process if the crude HCl contains a substantial amount of solids and/or heavy metal salts.

Since the recovered aqueous hydrochloric acid usually is not clean enough to be a useful raw material, several suggestions have been made to purify the hydrochloric acid.

Chemical Abstracts 82(10):63893 g relates to a process of burning organic wastes containing chlorides to convert the chlorides to HCl. The combustion gas is countercurrently contacted with a solvent in a condenser and the resulting concentrated solvent together with diluted HCl, recovered in the later process, is vacuum distilled to obtain concentrated HCl. The HCl-containing combustion gas from the distillation column is further washed with water to remove the remaining HCl from the gas and the resulting diluted HCl is recycled to the distillation column.

However, in many cases it would be desirable to further increase the purity of crude aqueous hydrochloric acid recovered from the combustion gases resulting from waste incineration or recovered from other sources.

German Offenlegungsschrift DE-A-38 21 482 relates to a process of purifying combustion gases containing hydrochloric acid and sulfur dioxide. The sulfate portion of the combustion gases is precipitated with calcium ions and the chloride portion is subjected to a pyrohydrolysis. The combustion gases are contacted with an aqueous suspension of magnesium hydroxide whereby the main portion of magnesium hydroxide is converted to magnesium chloride and magnesium sulfate. In the pyrohydrolysis magnesium chloride is converted to magnesium oxide and HCl. HCL is passed through an adiabatic adsorption column where 15 to 18 wt.-% hydrochloric acid is obtained. The hydrochloric acid can be concentrated to 30 wt.-% and purified in a concentrator. The German Offenlegungsschrift states that hydrochloric acid of very high purity is obtained. However, the described process requires a large amount of magnesium chloride. Furthermore, the way of purifying the hydrochloric acid is not indicated.

Accordingly, it remains desirable to provide an effective method of purifying crude aqueous hydrochloric acid, for example recovered from the combustion gases resulting from waste incineration or recovered from any other HCl containing source which method does not require the addition of a large amount of chemical compounds and by which method aqueous hydrochloric acid of high purity is obtained.

SUMMARY OF THE INVENTION

Surprisingly, it has been found that aqueous hydrochloric acid of very high purity can be obtained in a process for purifying crude aqueous 5 to 20 wt.-% hydrochloric acid which purification process comprises the steps of a) evaporating water or a water/HCl mixture from the crude aqueous hydrochloric acid at a pressure of from 0.01 to 1.0 bar and a temperature of from 10° to 100° C. until a crude, about azeotropic mixture of water and HCl is obtained;

b) distilling the mixture obtained in step a) in a distillation apparatus at a pressure of from 0.1 to 1.5 bar and a temperature of from 50° to 110° C.; and c) distilling the liquid mixture, left at the bottom of the distillation apparatus used in step b), at a pressure of from 0.5 to 2.5 bar and a temperature of from 80° to 130° C.

The crude aqueous hydrochloric acid can for example be recovered from combustion gases originating from waste incineration.

According to the process of the present invention, impurities such as solids, for example ashes or heavy metals (which are typically present in their salt form)

can be effectively removed from the aqueous hydrochloric acid. Typically, about 99%, very often even about 99.9% or more, of the solids and heavy metal salts contained in the crude aqueous hydrochloric acid can be removed by the process of the present invention. That means that the aqueous hydrochloric acid which has been purified according to the process of the present invention generally contains only up to 1 percent, preferably only up to 1 per mil, based on the weight of solids and of heavy metal salts contained in the crude aqueous hydrochloric acid prior to the purification process. The purified aqueous hydrochloric acid can be reused in chemical processes and so on. Accordingly, by the process of the present invention hydrochloric acid is obtained in the form of a valuable raw material instead of in the form of waste which has to be disposed of.

BRIEF DESCRIPTION OF THE DRAWING

The drawing is a schematic illustration of a flowsheet for the process of the present invention.

DETAILED DESCRIPTION OF THE INVENTION

Preferably, crude 5 to 20 wt.-% hydrochloric acid is purified according to the process of the present invention which has been recovered from combustion gases originating from waste incineration.

Waste incineration, namely the incineration of organic materials containing chlorides and the recovery of crude aqueous hydrochloric acid therefrom is well known in the art. The waste may be municipal waste or may originate from chemical production plants, from the packaging industry, etc. HCl gas which is generated as a by-product when incinerating chloride containing materials is absorbed in an acid scrubbing tower. Acid scrubbing is well known. One method is for example described in the above-mentioned British patent specification 1 350 727. The desired concentration of the crude aqueous hydrochloric acid of 5 to 20 wt.-% is achieved by recycling diluted aqueous hydrochloric acid to the acid scrubbing tower.

The purification of crude aqueous 5 to 20, preferably 10 to 17 wt.-% hydrochloric acid is described below in detail.

The purification process of the present invention comprises a three stage evaporation. In a first step a) water or a water/HCl mixture is evaporated until a crude, about azeotropic mixture of water and HCl is obtained. This mixture is an aqueous hydrochloric acid having an HCl concentration between about 15 and 21 wt.-%, typically between about 20 and 21 wt.-%. Step a) is carried out at a pressure of from 0.01 to 1 bar, preferably from 0.05 to 0.5 bar, more preferably from 0.07 to 0.3 bar and most preferably from 0.10 to 0.15 bar. Step a) is carried out at a temperature of from 10° to 100° C., preferably from 20° to 80° C., more preferably from 40° to 70° C. and most preferably from 55° to 65° C.

Excess of water and a small portion of HCl goes into the gas phase. The gaseous water/HCl mixture generally contains about 0.5 to 10, in most cases about 3 to 7 wt.-% HCl, based on the weight of the total mixture. The amount of HCl depends on various parameters, such as the initial HCl concentration of the crude aqueous hydrochloric acid recovered from the combustion gases. Gaseous HCl can be condensed with water in an absorption unit, for example in an absorption tower known in the art. The adsorption tower can for example be an known adiabatic counter-current packed tower through which the gaseous HCl only flows once, in can be a multiple stage absorption tower comprising recirculating packed sections or it can be a known graphite falling-film type absorber.

The crude azeotropic mixture obtained in step a) is distilled in a purification step b) in a distillation apparatus at a pressure of from 0.1 to 1.5 bar, preferably from 0.2 to 0.9 bar, more preferably from 0.3 to 0.5 bar and most preferably at about 0.4 bar. A temperature of from 50° to 110° C., preferably from 60° to 100° C., more preferably from 70° to 95° C. and most preferably from 80° to 90° C. is maintained in step b).

The distilled, purified, about azeotropic mixture of water and HCl which has a HCl concentration of about 20.7 wt.-% and which is recovered from the head of the distillation apparatus used in step b) can be used without further purification in chemical processes etc. If a lower HCl concentration is desired, the azeotropic mixture recovered in step b) can be mixed with water or with the diluted water/HCl mixture which has been evaporated in step a). The purified, about azeotropic mixture of water and HCl is recovered from the head of the distillation apparatus used in step b) in gaseous form. Preferably, the gas is condensed and the gained condensation heat is used for heating the crude aqueous hydrochloric acid used in step a). In step b) preferably from 20 to 60%, more preferably from 35 to 45% of the total weight of the crude, about azeotropic mixture which has been fed into the distillation apparatus used in step b) is recovered from the head of the distillation apparatus and removed for further use.

The remaining liquid mixture, left at the bottom of the distillation apparatus used in step b) is transferred to another distillation apparatus and distilled in a step c) of the process of the present invention. In step c) a pressure of from 0.5 to 2.5 bar, preferably from 0.7 to 2.0 bar, more preferably from 0.8 to 1.5 bar and most preferably from 1.0 to 1.1 bar is maintained. A temperature of from 80° to 130° C., preferably from 90° to 120° C., more preferably from 100° to 120° C. and most preferably about 110° C. is maintained in step c). A heat source used in step c) preferably is steam having a pressure of from 3 to 12 bar, preferably from 3.5 to 5.0 bar, and a temperature of from 130° to 190° C., preferably from 135° to 155° C. The weight ratio between steam and the amount of HCl in the distillation step c) generally is from 2-5:1, preferably from 3-4:1.

The distilled, about azeotropic mixture of water and HCl which is recovered from the head of the distillation apparatus used in step c) can be used without further purification in chemical processes etc.. The purified, about azeotropic mixture of water and HCl is recovered from the head of the distillation apparatus used in step c) in gaseous form. Preferably, the gas is condensed and the gained condensation heat is used for heating the crude, about azeotropic mixture of water and HCl used in step b). Preferably from 60 to 90%, more preferably from 70 to 80% of the total weight of the liquid mixture fed into the distillation apparatus used in step c) is recovered from the head of the distillation apparatus and removed for further use.

The remaining water/HCl mixture, left at the bottom of the distillation apparatus used in step c) is contaminated with a substantial amount of solids, such a heavy metals and ash. It is removed from the distillation apparatus and can be transferred to a water treatment system for further treatment and disposal. The impure water/HCl mixture left at the bottom of the distillation apparatus generally is only between 10 and 20% of the total weight of the crude, about azeotropic mixture which has been fed into the distillation apparatus used in step b). Accordingly, the yield of the purified, about azeotropic aqueous hydrochloric acid generally is between 80 and 90, based on the total weight of the crude, about azeotropic mixture which has been fed into the distillation apparatus used in step b).

The process of the present invention is further illustrated by the drawing which represents a schematic illustration of a flowsheet of the process of the present invention.

The crude aqueous 5 to 20 wt.-% hydrochloric acid is fed into a storage device 2, such as a storage tank, via an inlet conduit 1. From the storage device 2 it is fed into a first distillation apparatus 4 via a conduit 3. The distillation apparatus 4 is equipped with a heat exchanger 5, for example a falling film heat exchanger, wherein the crude aqueous hydrochloric acid is preheated. Water which is generally mixed with minor amounts of HCl is evaporated in a first process step a) in the first distillation apparatus 4, which for example comprises a known evaporator drum, as described above and removed from the distillation apparatus 4 via a conduit 6. From the conduit 6 it is fed into an absorption unit 7, for example a graphite falling-film type absorption tower, for further treatment. The crude, about azeotropic mixture of water and HCl wich is left at the bottom of the first distillation apparatus 4 is removed therefrom via conduits 8a and 8b and then via conduit 8.

From conduit 8 the crude, about azeotropic mixture of water and HCl is fed into a second distillation apparatus 9 which is equipped with a heat exchanger 10 wherein the crude, about azeotropic mixture is preheated. The preheated mixture is distilled in a second process step b) as described above. The distilled, about azeotropic gaseous mixture of water and HCl is removed from the second distillation apparatus 9 via a conduit 11 and passed through the heat exchanger 5 of the first distillation apparatus 4. The gaseous mixture of water and HCl is condensed in the heat exchanger 5 and removed therefrom via the conduits 12 and 13. The liquid, pure mixture of water and HCl can be transferred from conduit 13 to the consumers and reused as a raw material. By the heat generated by the condensation of the gaseous mixture of water and HCl, the crude aqueous hydrochloric acid which is fed into the first distillation apparatus 4 via conduit 3 is heated.

The liquid mixture, left at the bottom of the second distillation apparatus 9, is removed therefrom via conduits 14a and 14b and then via conduit 14. From conduit 14 the liquid mixture is fed into a third distillation apparatus 15 wich is equipped with a heat exchanger 16 wherein the liquid mixture is preheated. The heat source for preheating the liquid mixture is steam which is fed into the heat exchanger 16 via a steam conduit 19. The condensed steam is removed from the heat exchanger 16 via a conduit. The preheated mixture is distilled in a third process step c) as described above. The distilled, about azeotropic gaseous mixture of water and HCl is removed from the third distillation apparatus 15 via a conduit 17 and and passed through the heat exchanger 10 of the second distillation apparatus 9. The gaseous mixture of water and HCl is condensed in the heat exchanger 10 and removed therefrom via the conduits 18 and 13. The liquid, pure mixture of water and HCl can be transferred from conduit 13 to the consumers and reused as a raw material. By the heat generated by the condensation of the gaseous mixture of water and HCl, the crude, about azeotropic mixture of water and HCl which is fed into the second distillation apparatus 9 via conduit 8 is heated. The remaining water/HCl mixture which is left at the bottom of the third distillation apparatus 15 is contaminated with a substantial amount of solids, such a heavy metals and ash. It is removed from the distillation apparatus 15 via conduits 21a and 21b and then via conduit 21 and can be transferred to a water treatment system (not shown) for further treatment and disposal.

The arrows in the drawing indicate the direction of the flow of the above described gaseous or liquid chemical compounds and mixtures in the conduits. The gases and liquids are transported through the conduits by means of pumps (not shown).

The conduits, storage device and distillation apparatuses illustrated in the drawing may be made from any suitable corrosion resistant material. Preferably, they are made of refractory material, ceramics, alloy steel, glass or plastic. The use of corrosion resistant plastics, such as vinyl ester resins, is preferred. The heat exchangers 5, 10 and 16 preferably contain carbon shells and tubes.

The process of the present invention is very effective for removing impurities from crude aqueous hydrochloric acid. Crude aqueous 5 to 20 wt.-% hydrochloric acid prior to the purification process of the present invention generally has a iron content of more than 500 ppm, typically more than 1000 ppm and in many cases more than 3000 ppm, and/or a total heavy metals content of generally more than 100 ppm, typically more than 300 ppm and in many cases more than 800 ppm and/or a solids content of generally more than 500 ppm, typically more than 1000 ppm and in many cases more than 3000 ppm. The aqueous hydrochloric acid which has been purified according to the process of the present invention has a HCl concentration of up to 21 percent and generally has a iron content of less than 10 ppm, typically less than 5 ppm and in many cases even less than 2 ppm, a total heavy metals content of generally less than 5 ppm, typically less than 1 ppm and in many cases even less than 0.2 ppm and a solids content of generally less than 5 ppm, typically less than 1 ppm and in many cases even less than 0.1 ppm.

We claim:

1. A process for purifying crude aqueous 5 to 20 wt. % hydrochloric acid comprising the steps of
   a) evaporating water or a water/HCl mixture from said crude aqueous hydrochloric acid at a pressure of from about 0.05 to about 0.5 bar and a temperature of from about 20 to about 80° C. until a crude, azeotropic mixture of water and HCl is obtained;
   b) distilling said crude, azeotropic mixture of water and HCl obtained in step a) in a distillation apparatus containing a head and a bottom at a pressure of from about 0.1 to about 1.5 bar and a temperature of from about 50° to about 110° C. wherein a purified gaseous, azeotropic mixture of water and HCl is recovered from the head of the distillation apparatus and a liquid mixture is left at the bottom of the distillation apparatus; and
   c) distilling the liquid mixture left at the bottom of the distillation apparatus used in step b) at a pressure of from about 0.5 to about 2.5 bar and a temperature of from about 80° to about 130° C.

2. The process of claim 1 wherein step a) is carried out at a pressure of from about 0.07 to about 0.3 bar and a temperature of from about 40° to about 70° C.

3. The process of claim 2 wherein step a) is carried out at a pressure of from about 0.10 to 0.15 bar and a temperature of from about 55° to about 65° C.

4. The process of claim 1 wherein step b) is carried out at a pressure of from about 0.2 to about 0.9 bar and a temperature of from about 60° to about 100° C.

5. The process of claim 4 wherein step b) is carried out at a pressure of from about 0.3 to about 0.5 bar and a temperature of from about 70° to about 95° C.

6. The process of claim 5 wherein step b) is carried out at a pressure of about 0.4 bar and a temperature of from about 80° to about 90° C.

7. The process of claim 1 wherein step c) is carried out at a pressure of from about 0.7 to about 2.0 bar and a temperature of from about 90° to about 120° C.

8. The process of claim 7 wherein step c) is carried out at a pressure of from about 0.8 to about 1.5 bar and a temperature of from about 100° to about 120° C.

9. The process of claim 8 wherein step c) is carried out at a pressure of from about 1.0 to about 1.1 bar and a temperature of about 110° C.

10. The process of claim 1 wherein in step c) the liquid mixture is preheated prior to distillation using steam having a pressure of from about 3 to about 12 bar and a temperature of from about 130° to about 190° C. as a heat source via heat exchange.

11. The process of claim 10 wherein the steam has a pressure of from about 3.5 to about 5.0 bar and a temperature of from about 135° to about 155° C.

12. The process of claim 1 wherein
i) the purified gaseous, azeotropic mixture of water and HCl which is recovered from the head of the distillation apparatus in step b) is condensed and the gained condensation heat is used in step a) for heating the crude aqueous 5 to 20 wt. % hydrochloric acid and
ii) a purified gaseous, azeotropic mixture of water and HCl is recovered in step c), said mixture is condensed and the gained condensation heat is used in step b) for heating the crude, azeotropic mixture of water and HCl.

13. The process of claim 1 wherein purified gaseous, azeotropic mixtures of water and HCl are recovered in steps b) and c) and said mixtures are condensed to produce purified aqueous hydrochloric acid which contains solids and heavy metal salts in an amount of up to 1 percent, based on the weight of solids and of heavy metal salts contained in the crude aqueous 5 to 20 wt. % hydrochloric acid prior to the purification process.

14. The process of claim 13 wherein the purified aqueous hydrochloric acid contains up to 0.1 percent of the weight of solids and of heavy metal salts contained in the crude aqueous 5 to 20 wt. % hydrochloric acid prior to the purification process.

15. The process of claim 1 wherein the crude aqueous 5 to 20 wt. % hydrochloric acid has been recovered from combustion gases originating from waste incineration.

* * * * *